United States Patent
Sargent et al.

(10) Patent No.: US 6,271,861 B1
(45) Date of Patent: Aug. 7, 2001

(54) SMOOTH SHADING OF AN OBJECT

(75) Inventors: Robert S. Sargent, San Jose; Paul A. George, Los Altos, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/056,502

(22) Filed: Apr. 7, 1998

(51) Int. Cl.[7] .................................. G06T 15/00
(52) U.S. Cl. .................... 345/432; 345/431; 345/147
(58) Field of Search ......................... 345/423, 431, 345/432, 426, 147, 441

(56) References Cited

U.S. PATENT DOCUMENTS

| | | | |
|---|---|---|---|
| 5,163,126 | * 11/1992 | Einkauf et al. | 345/423 |
| 5,333,245 | * 7/1994 | Vecchione | 345/430 |
| 5,463,722 | * 10/1995 | Venolia | 345/433 |
| 5,602,979 | * 2/1997 | Loop | 345/423 |
| 5,659,671 | * 8/1997 | Tannenbaum et al. | 345/426 |
| 5,801,670 | * 9/1998 | Green et al. | 345/147 |
| 5,936,671 | * 8/1999 | Van Beck et al. | 348/413 |
| 5,936,869 | * 8/1999 | Sakaguchi et al. | 345/423 |
| 6,002,408 | * 12/1999 | Long | 345/431 |
| 6,047,088 | * 4/2000 | Van Beck et al. | 382/243 |

OTHER PUBLICATIONS

Foley et al., "Fundamentals of Interactive Computer Graphics," Addison Wesley Publishing Co., 553–573, 1982.

* cited by examiner

Primary Examiner—Cliff N. Vo
(74) Attorney, Agent, or Firm—Fish & Richardson P.C.

(57) ABSTRACT

A method and apparatus for defining a smooth shading across an object for display on a raster output device. The method including converting the object to a mesh, rendering the mesh displaying the object having a shading defined by the mesh and editing the mesh until a desired result is achieved in the displayed object. The method may include a method for defining a gradient across an object for display on a raster output device where the object includes a boundary comprising multisegment edges in which the method includes selecting the object and finding the boundary for the object. Thereafter a bounding box is created including four corners that encloses the object boundary. Four points on the boundary of the object are identified that are closest to the four corners of the boundary box. A single patch mesh may be constructed from the four points and segments connecting pairs of the four points. The single patch mesh may be further divided to create a series of patches defining the gradient where patch boundaries correspond to segment vertices in the multisegment edges of the boundary of the object.

20 Claims, 11 Drawing Sheets

SMOOTH SHADING OF AN OBJECT

The present invention relates generally to methods and systems for shading computer generated images and more particularly to methods and apparatus for shading objects displayed on a raster output device.

BACKGROUND OF THE INVENTION

In many computer systems, it is common to represent and convey information to a user through digital images. These images may take a variety of forms such as alphanumeric characters, graphics and other pictorial representations. The digital images may be conveyed to a user on a raster or continuous tone display device, such as a video monitor, printer and the like. Typically, the digital images are stored in digital form, manipulated and then displayed.

Digital images are generally stored as a geometric description of a scene. The description can be manipulated by the user, then converted to digital raster image data for display. How a two or three dimensional object appears when it is displayed to a user depends on numerous factors including the types of light sources illuminating the object; the object's properties including color, texture and reflectance; and the object's position and orientation with respect to the light sources, the viewer and other surfaces which may reflect light on the object.

It is often desirable to present objects for display in color. In conventional display systems, color may be applied to a region by defining a single color for the entire region (a "flat" coloring), or to add realism, a plurality of colors may be employed. A transition between colors across the surface of an object is referred to as a color gradient. In. order to display a realistic image, a smooth transition between colors across painted areas is required.

SUMMARY OF THE INVENTION

In one aspect, the invention provides a method for defining a smooth shading across an object for display on a raster output device and includes converting the object to a mesh, rendering the mesh, displaying the object having a shading defined by the mesh and editing the mesh until a desired result is achieved in the displayed object.

Aspects of the invention include numerous features. The step of converting the object into a mesh may include determining a boundary for the object enclosed by a boundary box having four corners, determining four points on a boundary of the object that are closest to the four corners of the boundary box, determining four edges on the boundary of the box that connect the four corners, constructing a mesh from the four edges and four corners on the boundary of the object resulting in a single patch mesh including four mesh points corresponding to the four corner point on the boundary, selecting a shading procedure and determining colors to the four mesh points.

The step of determining colors may include receiving a user selection for the colors. The method may further include receiving a user selection to define the number and arrangement of patches in the mesh where the mesh is of to be of form the form of an N×M matrix of patches, subdividing the mesh at N−1 regular intervals in a u direction of the mesh and subdividing the mesh at M−1 regular intervals in a v direction of the mesh.

The shading procedure may determine the colors by receiving a color selection for each corner from a palette of available colors where the selection is performed by the user. The shading procedure may determine the colors by sampling the object at locations corresponding to the mesh points.

One or mor edges of the boundary for the object may include multisegment cubic Bezier curves and the step of constructing a mesh may include constructing boundary edges for the mesh where the boundary edges are multisegment cubic Bezier curves having an identical number of segments as their corresponding edge in the boundary.

The step of editing the mesh may include adding mesh points and defining colors for mesh points resulting in the uniform subdivision of the mesh at the new mesh point. The step of editing the mesh includes one of adding a mesh point, deleting a mesh point, adjusting a mesh point tangent, moving a mesh point, and changing the color of a mesh point.

In another aspect, the invention provides a computer program, tangibly stored on a computer-readable medium, for rendering a two dimensional (2D) patch associated with an object to achieve a smooth shading across the object where the 2D patch defines a complex gradient including at least one foldover edge. The computer program includes instructions for causing a computer to convert the object to a mesh, render the mesh, display the object having a shading defined by the mesh and edit the mesh until a desired result is achieved in the displayed object.

In another aspect, the invention provides a method for defining a smooth shading across an object for display on a raster output device where the object includes a boundary comprising edges at least one of which is a multisegment curve. The method includes converting the object to a mesh including creating a mesh boundary that includes edges that include a same number of segments as a corresponding edge in the boundary of the object, rendering the mesh, displaying the object having a shading defined by the mesh and editing the mesh until a desired result is achieved in the displayed object.

In another aspect, the invention provides a method for defining a gradient across an object for display on a raster output device where the object includes a boundary comprising multisegment edges. The method includes converting the object to a mesh including creating a mesh boundary that follows a geometry of the boundary of the object and creating a series of patches defining the gradient where patch boundaries correspond to segment vertices in the multisegment edges of the boundary for the object.

In another aspect, the invention provides a method for defining a gradient across an object for display on a raster output device where the object includes a boundary comprising multisegment edges. The method includes selecting the object, finding the boundary for the object, creating a bounding box including four corners that encloses the object boundary, identify four points on the boundary of the object that are closest to the four corners of the boundary box, constructing a single patch mesh from the four points and segments connecting pairs of the four points and dividing the single patch mesh to create a series of patches defining the gradient where patch boundaries correspond to segment vertices in the multisegment edges of the boundary of the object.

The invention includes numerous advantages. The present invention provides a mechanism to easily construct complex gradients for use in the display of two dimensional images. These and other advantages may be readily apparent from the detailed description and claims provided below.

DETAILED DESCRIPTION

Digital images are generally stored as a geometric description of a scene. The description can be manipulated by a user invoking a drawing or other graphics application, then converted to digital raster image data for output. An example of a drawing application is Adobe Illustrator, available from Adobe Systems Incorporated, of San Jose, Calif.

Figure 11:
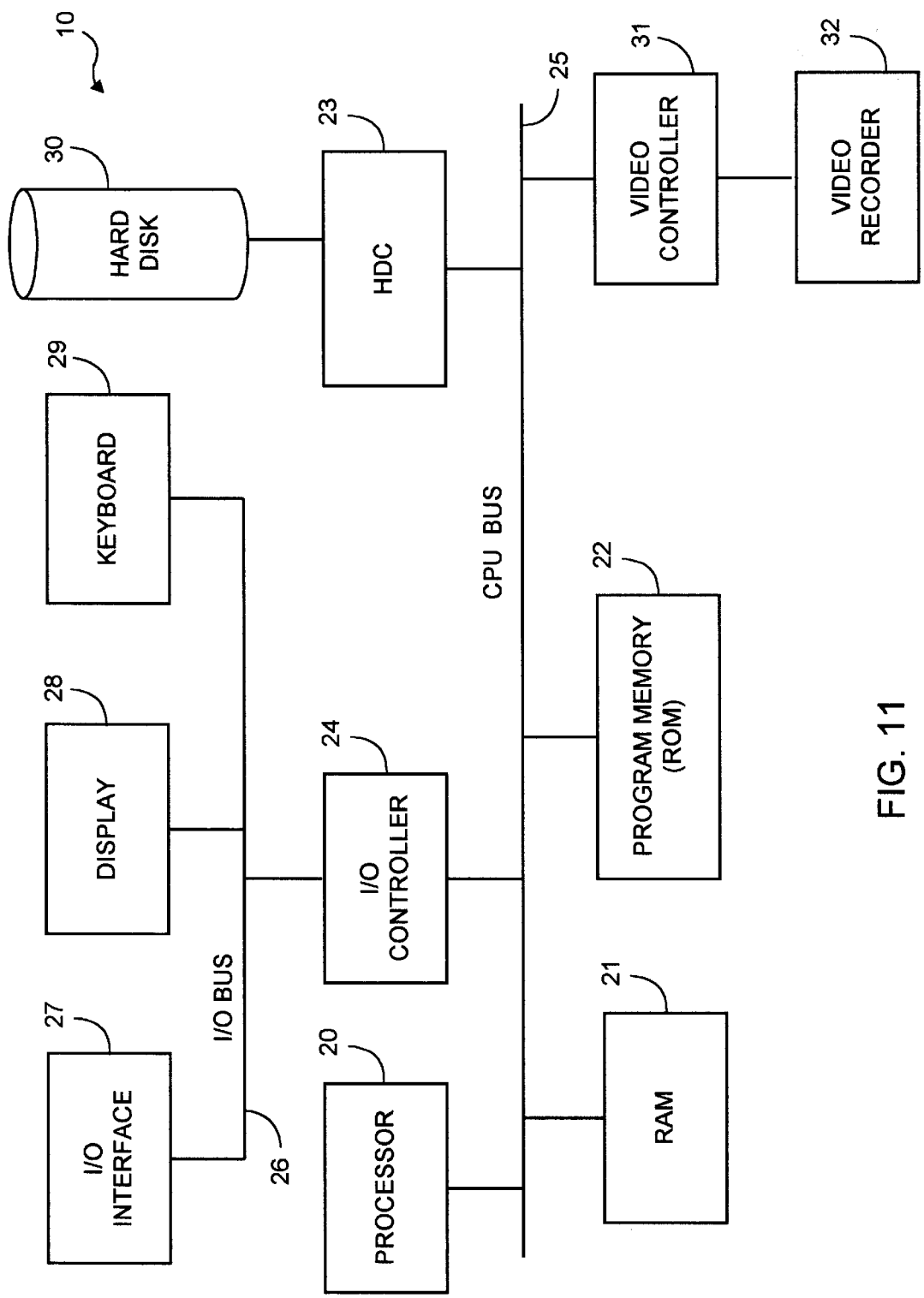
FIG. 11 is a schematic block diagram of a computer system according to the invention.

FIGS. 2a and 2b show a two-dimensional object 110 displayed in a display space 112. Workspace 112 is generated by a graphical user interface associated with a drawing application (not shown) executing on computer 10 (FIG. 11). Object 110 defines a region 114 of arbitrary shape and size. A two-dimensional shading of region 114 is defined by a mesh 116 which may be superimposed over object 110 and displayed in display space 112 by manipulation of the graphical user interface associated with the drawing application. Mesh 116 may be modified by a user to adjust a color gradient across region 114.

Mesh 116 is a user-editable structure created from a graphic object (e.g., object 110). Color may be applied to certain points in mesh 116 resulting in the smooth shading of the area enclosed by mesh 116. Mesh 116 is rendered in a user-defined (x,y) coordinate space. Color interpolation and other operations and properties are defined in a parameterized (u,v) coordinate space.

In one implementation, a Cartesian, or rectangular, mesh structure with four boundary curves 117 is defined. Alternatively, a polar mesh structure, i.e. one that uses polar coordinates may be used. Other implementations may use other topologies or structures as is known in the art.

Mesh 116 may be used to describe a non-linear color gradient over object 110. Mesh 116 may include a collection of adjoining patches 109 with shared edges. Alternatively, mesh 116 may be of the form of a single patch mesh and include a single patch 109. The number and arrangement of patches in a mesh may be defined by the user or inferred from the underlying structure of a given object. The creation and modification of mesh 116 is described in detail below in reference to FIG. 3.

Patch 109 is a two-dimensional parametric surface. An associated color function interpolates corner colors across the parametric surface. A bi-linear interpolation may be used or other interpolation methods may be selected. A gradient is defined by the mapping from interpolated colors on the parametric surface to points within the object. Each patch in the mesh has an associated unit square with equivalent topology. Each unit square has 4 corners with 4 associated colors. Shared edges share corner colors. A mesh allows the user to create a complex geometry in the gradient.

Figure 2:
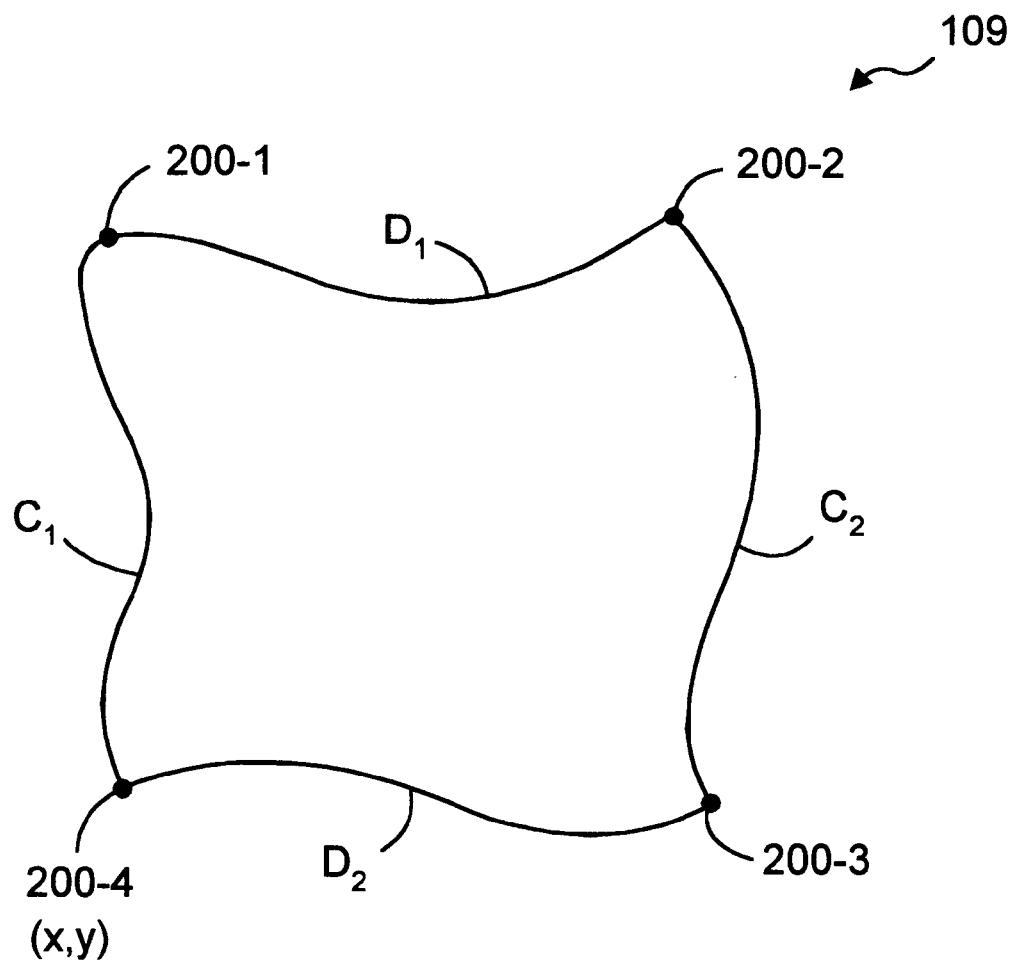
FIG. 2 is a schematic diagram of a patch and associated unit square according to the invention.

Referring now to FIG. 2, each patch 109 may be of the form of a bi-cubic patch. A bi-cubic patch is a parametric surface including four corners 200 bounded by piecewise cubic curves (C1, C2, D1, D2). The patch may be of the form of a Coons patch bounded by boundary curves where each boundary curve is constructed of a sequence of Bezier curves (hereinafter a "Coons patch"). The Coons patch includes a mapping from a unit square (not shown) including four corners to the patch. For the creation of gradients, two-dimensional curves are used.

The mapping may be defined by a pair of parametric functions, one for each dimension. If u and v are the parameters corresponding to the two axes of a unit square, then a function X(u,v) maps points on unit square to x coordinate values on patch 109. A second function, Y(u, v) maps each point on the unit square (u,v) to y coordinates on the patch 109. Therefore, each point on the parametric surface (patch) is defined as (x, y)=(X(u,v), Y(u,v)). Specifically for a bi-cubic Bezier patch, which is a surface defined with cubic Bezier curves, the functions are of the form:

$$S(u,v)=\Sigma^3_{i=0}\Sigma^3_{j=0}P_{ij}B_i(u)B_j(v)$$

where $P_{ij}$ is the control point for row i, column j, of the Bezier control net, and $B_i(u)$ and $B_j(v)$ are the Bernstein polynomials for u and v:

$$B_0(t)=(1-t)^3$$

$$B_1(t)=3t(1-t)^2$$

$$B_2(t)=3t^2(1-t)$$

$$B_3(t)=t^3$$

Figure 1A:
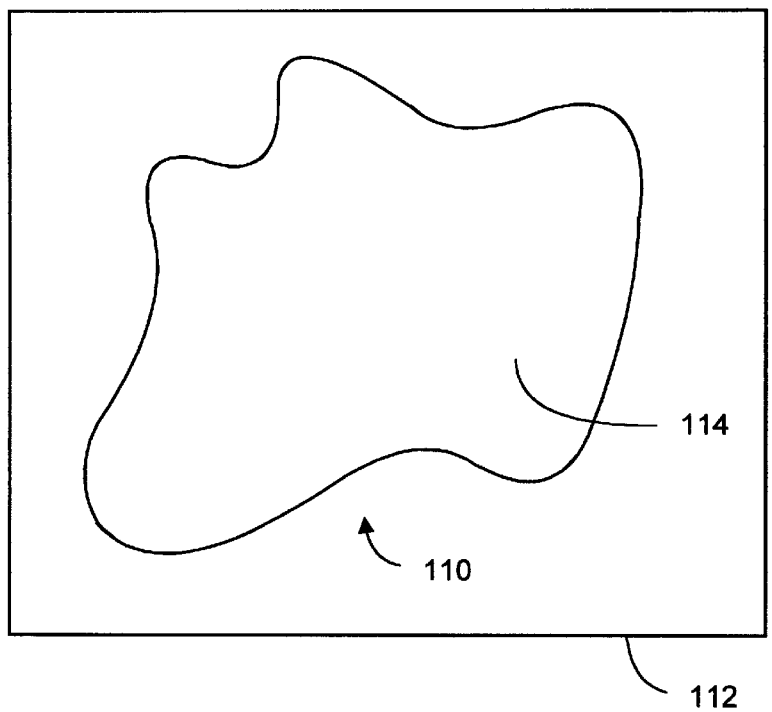
FIG. 1a is a schematic diagram of an object for display in a display space according to the invention.
Figure 1B:
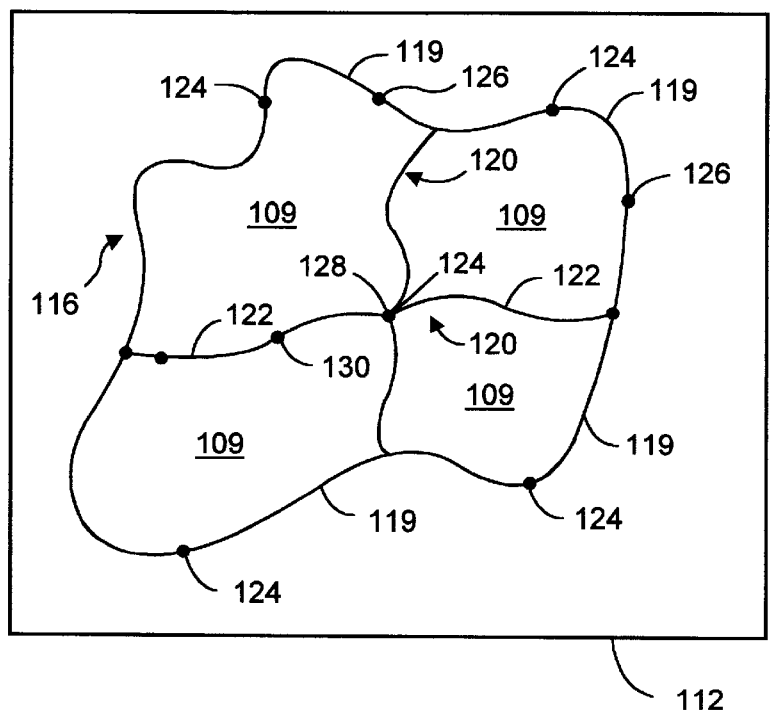
FIG. 1b is a schematic diagram of a patch mesh associated with the object of FIG. 1a according to the invention.

As shown in FIG. 1b, mesh 116 may include some or all of the following elements: gridline 120, edge 122, mesh point 124, edge point 126, hard point 128 and soft point 130.

A gridline 120 is a line of constant u or v through mesh 116 between opposite boundary curves 117. In one implementation, a gridline 120 is a multisegment cubic Bezier curve in (x,y) space. An edge 122 is a portion of a gridline between two adjacent mesh points 124. In one embodiment, an edge 122 is also a multisegment cubic Bezier curve.

A mesh point 124 is formed at the intersection of a u-axis and a v-axis gridline 120. A mesh point 124 includes a user-editable color.

An edge point 126 is a point on an edge (between two mesh points) which is a shared point between two consecutive cubic Bezier segments defining an edge. Edge points 126 may be hard or soft.

A hard point 128 is a point which is directly controlled by the user. In one implementation, mesh points and edge points may be hard points. That is, mesh points and edge points may have user-editable colors.

A soft point is a point which is created and maintained by the executing process. In most cases, soft points are invisible and of no interest to the user. When the user edits mesh 116 (using hard points) soft points are automatically created, adjusted and deleted as necessary (e.g. to maintain smooth edges). Hard and soft points are described in more detail below.

To specify a gradient, a user may manipulate control points associated with the mesh to achieve a desired gradient. Changes to the geometry of the patch results in color changes in the gradient. For example, a square shape produces a display characterized by a simple bilinear interpolation of the corner colors. If the left and right curves are made to curve inward at the middle, then resultant colors of the gradient will appear to be squeezed in the middle and fan out at the top and bottom. Thus, changes in the curves intuitively define changes in the gradient.

Figure 3:
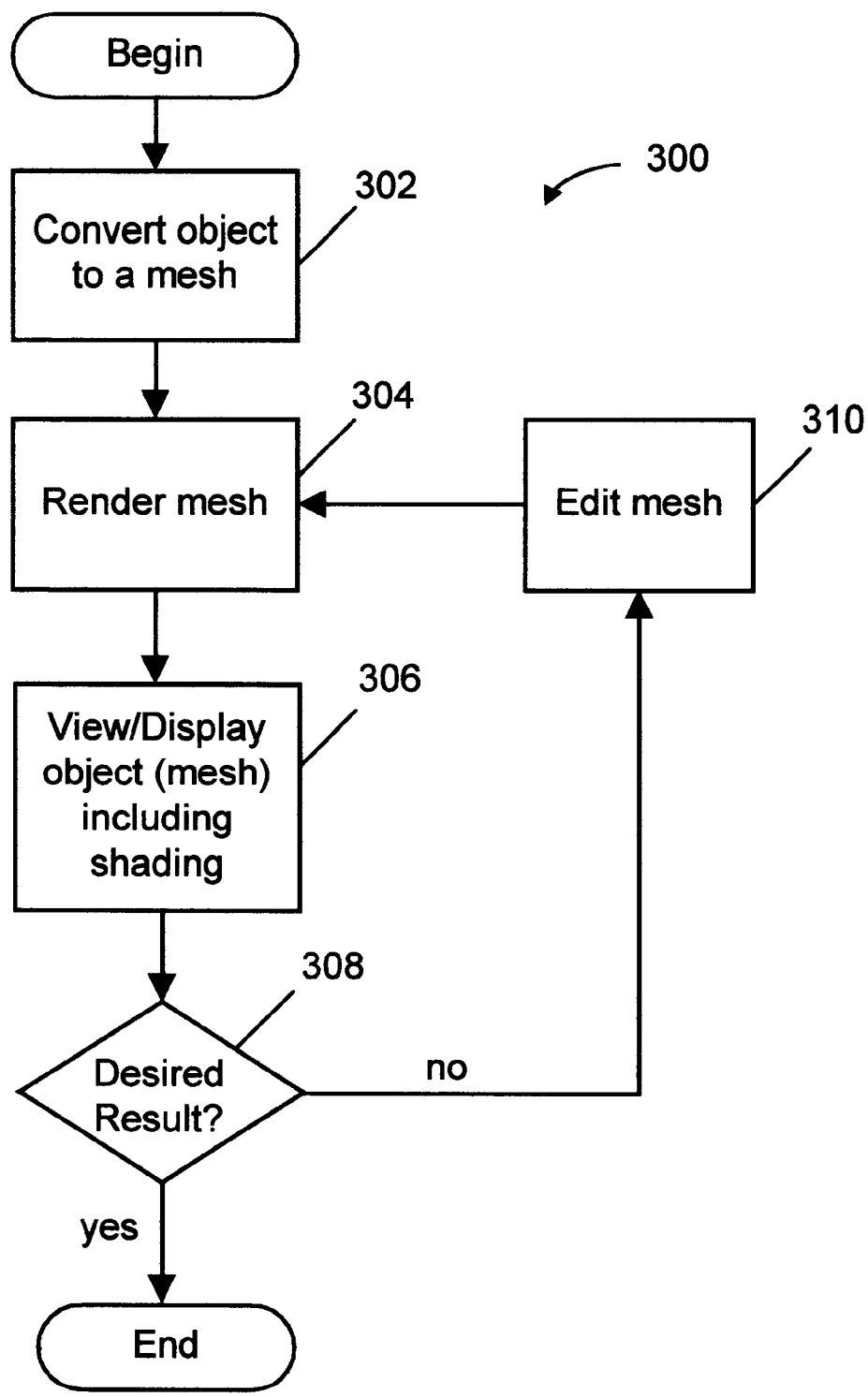
FIG. 3 is a flow diagram of a process for defining a color gradient according to the invention.

As shown in FIG. 3, a process 300 for defining a color gradient across a region in a display space includes converting an object into a mesh (302). The mesh as described above defines a bi-cubic patch (or series of bi-cubic patches) enclosing the region. The bi-cubic patch includes four corners having a color associated therewith and four curves connecting pairs of the corners forming a closed loop. The four curves define the color gradient across the bi-cubic patch as a function of the four colors associated with the four corners of the bi-cubic patch.

The bi-cubic patch may be rendered (304) and then the object may be displayed or printed (306). The mesh may be edited (310) if the results are not as desired (308). Each curve of the bi-cubic patch may be of the form of a piecewise Bezier curve having control handles which may be manipulated by a user to define the color gradient for the region (or a portion of the region). By manipulating the control handles of the piecewise Bezier curves for a given patch, complex shadings may be defined.

The editing of the mesh and subsequent rendering and display of the object including new shading profile (as defined by the mesh) is an iterative process which may terminate when a user has achieved satisfactory results, at which time the process ends (312).

Creating a Mesh

Figure 4:
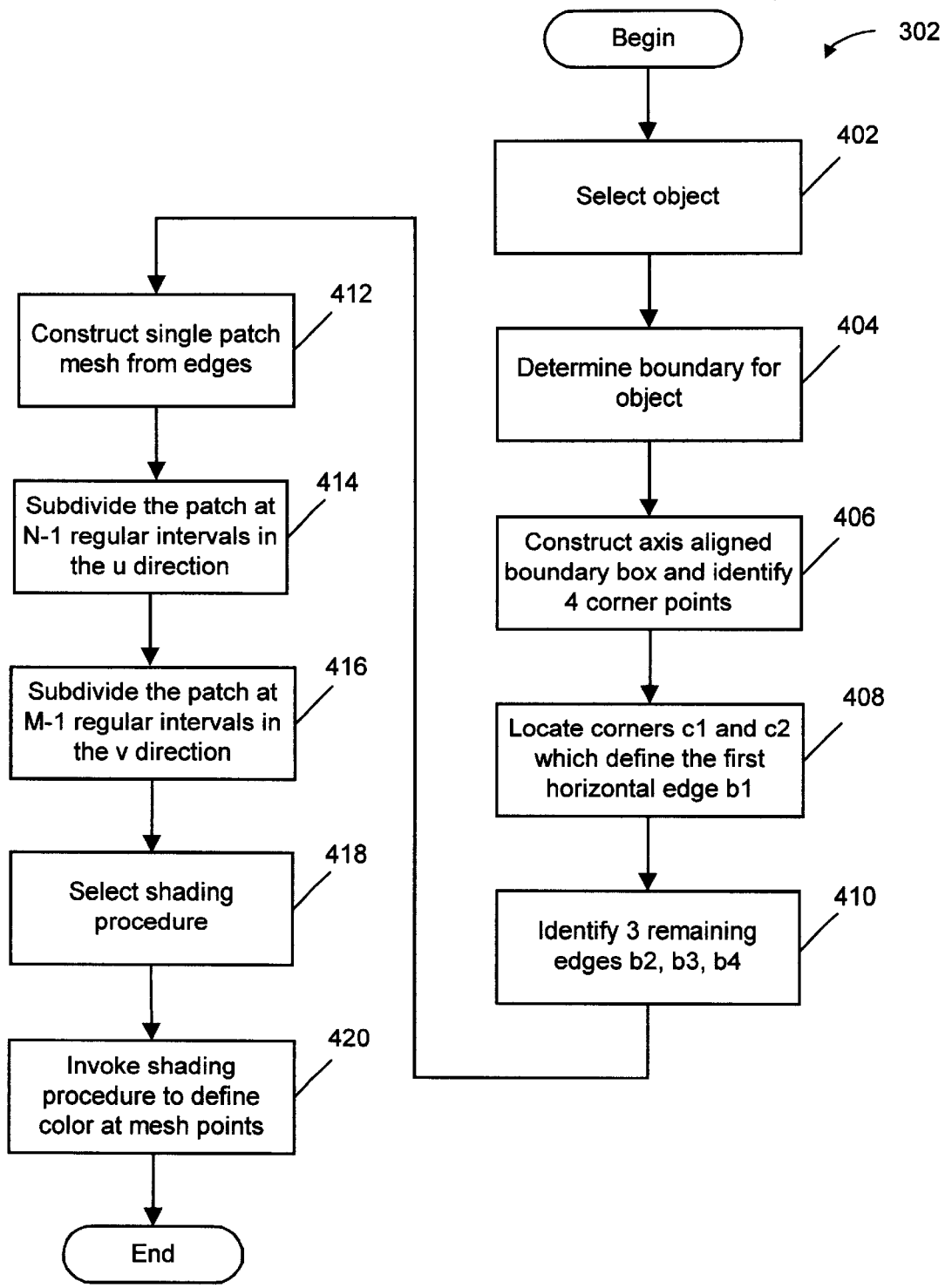
FIG. 4 is a flow diagram of a process for creating a mesh according to the invention.
Figure 5A:
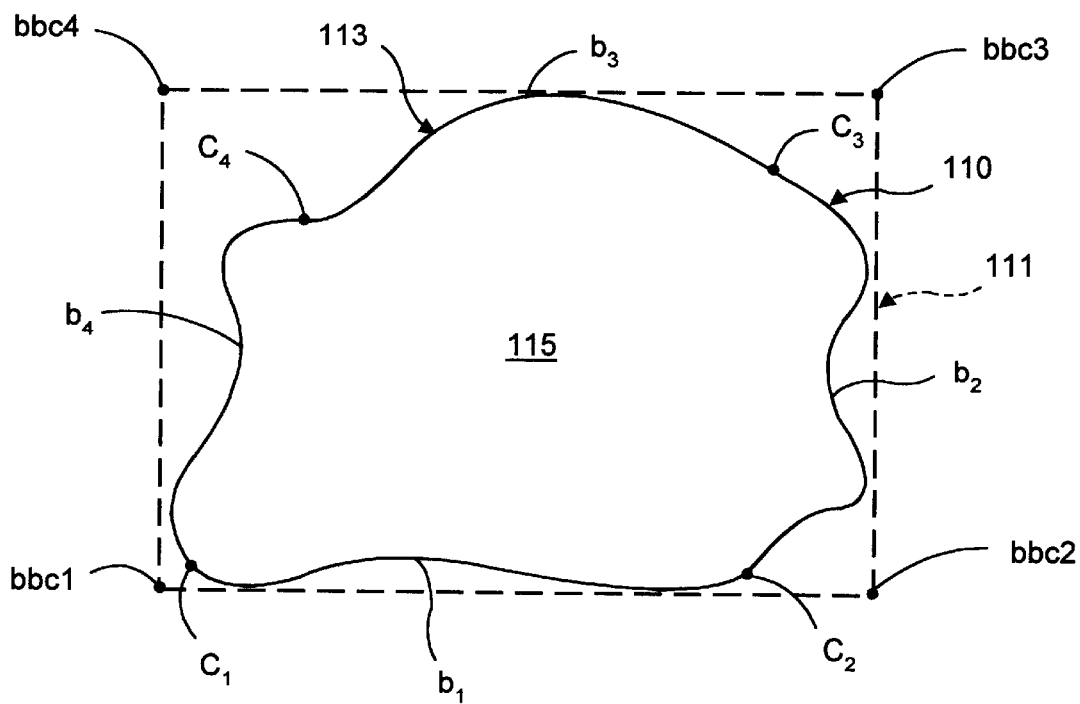
FIG. 5a is a schematic block diagram of a partially constructed mesh including bounding box according to the invention.
Figure 5B:
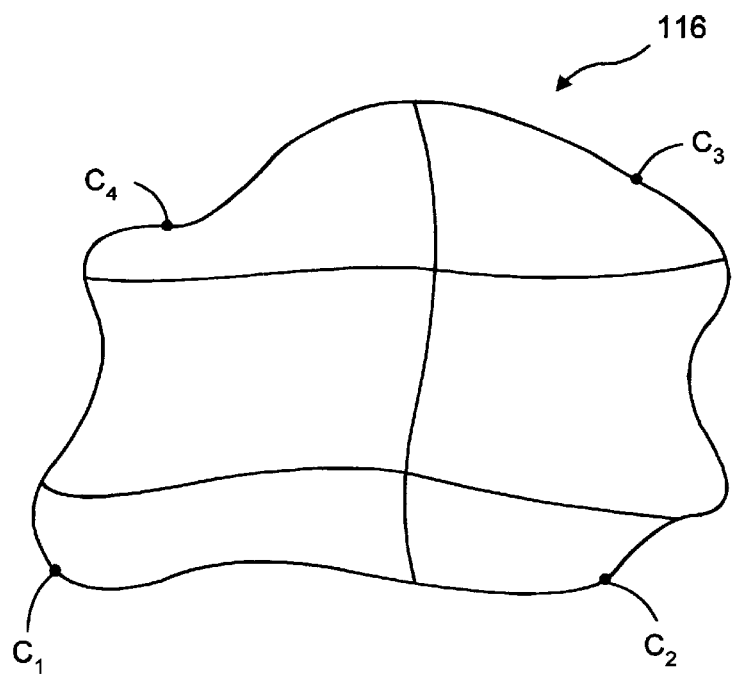
FIG. 5b is a schematic block diagram of a N×M mesh according to the invention.

FIGS. 4 and 5a–5b show a detailed description of process step 302 for converting an existing object into a mesh. Process step 302 operates to construct a single patch mesh which then may be subdivided to obtain an N by M patch mesh. The number of patches within a mesh may be defined by a user. Alternatively, the number of patches may be inferred from the structure of the underlying object. For example, the number of patches may be determined based on the number of segments used to form the boundary of an underlying object. Edge points formed at the junction of curve segments in the boundary of the object to which the mesh is applied may form vertices of gridlines in the mesh resulting in a grid of patches.

The process begins by selecting an object (402). The object may be selected by a selection mechanism provided by the drawing application. Alternatively, the selection may be made via a programmable API control. Typically, the object is a path or an image that includes an exterior boundary formed of cubic Bezier curves.

The boundary of the object is found (404). The boundary information may be provided to the process or alternatively may be determined by evaluating the particular object selected. An axis-aligned bounding box is constructed from which the four points on the boundary curve (the boundary of object 110) closest to each of the four corner points of the bounding box are determined (406). The four points on the boundary curve are established as the corners of the initial single patch mesh. For example, points c1, c2, c3 and c4 along boundary 113 of object 110 would be identified as the closest points to corners bbc1, bbc2, bbc3 and bbc4, respectively, of bounding box 111, as is shown in FIG. 5a.

From the four corners, two adjacent corners (c1 and c2) corresponding to a horizontal piece of the boundary are determined which correspond to the edge v=0 of the initial patch (408). Having identified this vertical edge, the remaining three edges of the initial patch are determined (410) resulting in the identification of four distinct boundary curves b1, b2, b3 and b4.

A single patch mesh 115 is constructed from the four boundary curves (412). As was described above, each boundary curve in the object may be constructed of multiple cubic Bezier segments. The construction of the single patch mesh includes the creation of multisegment (multi-edge) curves for each boundary curve that include soft edge points at the junction of each segment in the underlying boundary curve. If the user has selected the number of patches to be included in the mesh (by designating values for N and M respectively) then the single patch is subdivided at N−1 regular parametric intervals in the u direction (414) and M−1 regular parametric intervals in the v direction (416). The result is an N by M grid of patches as is shown in FIG. 5b. If no designation is provided, then the patch may be divided according to edge points on the boundary curves associated with the mesh.

A shading procedure is selected (418). The shading procedure includes a definition of color for points of the mesh (each mesh point). In one embodiment, the shading procedure may be selected from the group of flat, center and edge shadings. When a flat shading is invoked, the colors for all mesh points are set based on the colors for the respective locations in the original object. A center shading applies original colors to the to all vertices on the boundary of the object and applies a blend of the original color and white in an increasing percentage up to a designated percentage for interior vertices. Edge shading is the inverse of center shading.

For each mesh point of the resulting mesh, the shading procedure is invoked to assign a color to that point (420). In one implementation, the shading procedure operates to evaluate the object and if the object is a path, the shading procedure obtains the fill color associated with the object. If the object is an image, the shading procedure samples the image color at a point corresponding to the position of a respective node. The resulting color may then blended with white by a percentage which depends on the distance from the point to the boundary of the mesh. Alternatively, the user may be prompted to select a color from a color palette for each corner.

Thereafter the process ends resulting in an N by M mesh of patches whose exterior boundary matches the boundary of the object and whose color is determined by the shading procedure.

Rendering is the process of creating images from stored digital information. Conventional rendering schemes include steps of dividing each patch into triangles (or polygons) and the subsequent rendering of the triangles. More complex rendering schemes may be invoked that include additional steps including subdividing the patches into smaller sub-patches according to an adaptive subdivision routine, the grouping of patches into regions and the ordering of regions to be rendered.

A more detailed description of a rendering method for achieving smooth shading of an object may be found in the commonly-owned co-pending application, entitled "SMOOTH SHADING OF OBJECTS ON DISPLAY DEVICES" to William Bilodeau, et al., Ser. No. 08/844,701, filed Apr. 18, 1997, which is incorporated herein by reference. A second technique for rendering patches to account for foldover conditions may be found in the commonly-owned co-pending United States patent application entitled "DISPLAYING 2D PATCHES WITH FOLDOVER" to Stephen Schiller, et. al., filed Apr. 7, 1998, which is incorporated herein by reference.

Figure 6:
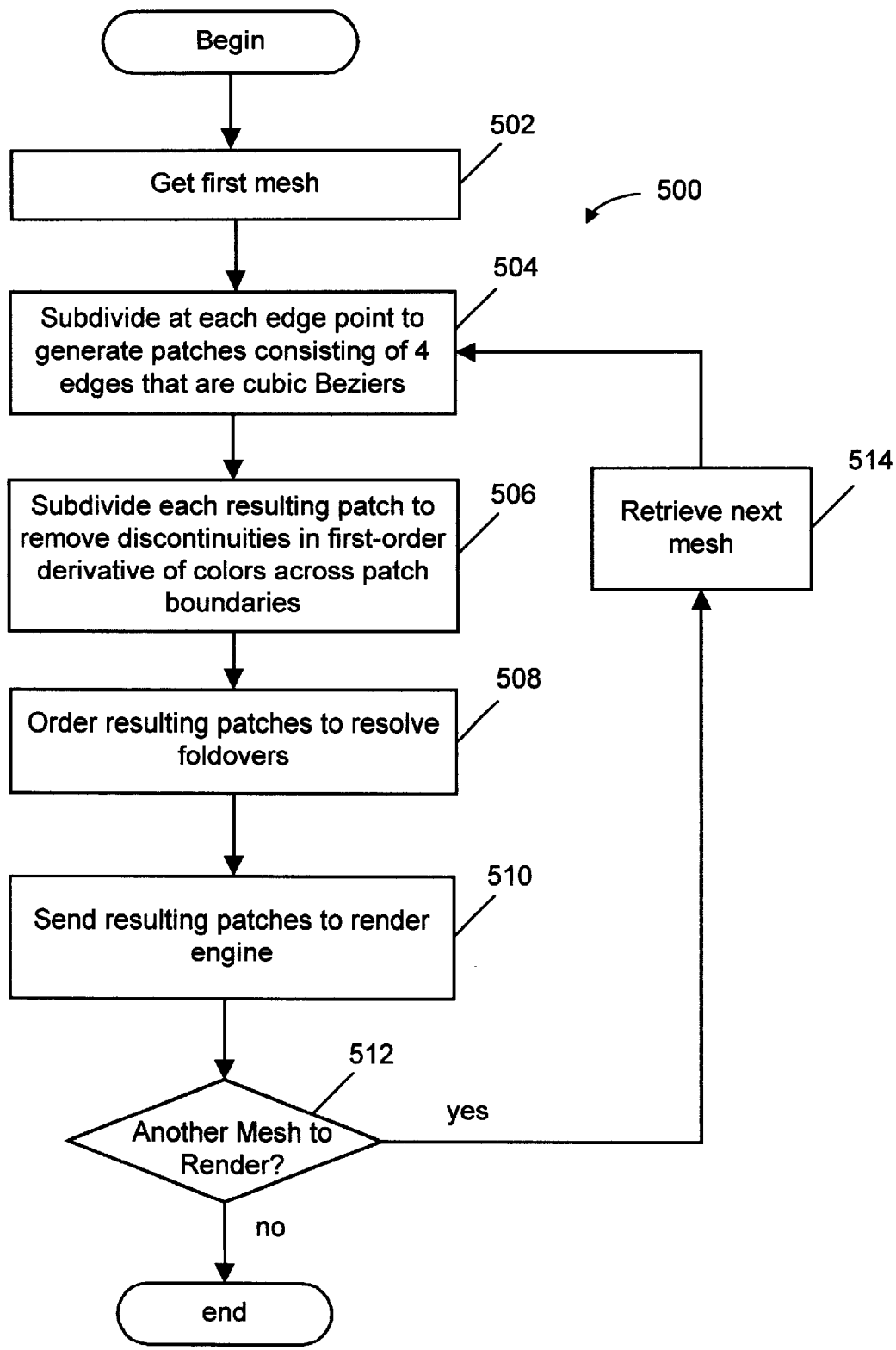
FIG. 6 is a flow diagram of a rendering process according to the invention.

In one implementation, a mesh is rendered according to a rendering process 500 as shown in FIG. 6. A first mesh is retrieved (502). The mesh is subdivided at each edge point to generate a series of patches that are characterized by boundary curves which are single cubic Beziers (504). Each resulting patch is further subdivided to remove discontinuities in first order derivatives of color across patch boundaries (506). Resulting patches are ordered to resolve any foldover conditions (508) and then sent according to the order to a rendering engine for rendering (510). A check is made to determine if more patches in the mesh need to be processed (512). If so, then the next patch is retrieved (514) and the process continues at step 504. When all of the patches in the mesh have been rendered, the process ends (516).

Mesh 116 (FIG. 1*b*) may be edited after creation. In order to achieve a more graphically pleasing gradient, one or more of the following operations may be invoked to edit the mesh and modify the gradient produced. The options for editing include: adding a mesh point or gridline; deleting a mesh point or gridline; changing the color of a mesh point; moving a mesh point or edge point; adjusting edge point control handles; and adjusting a front-back patch ordering.

Figure 7:
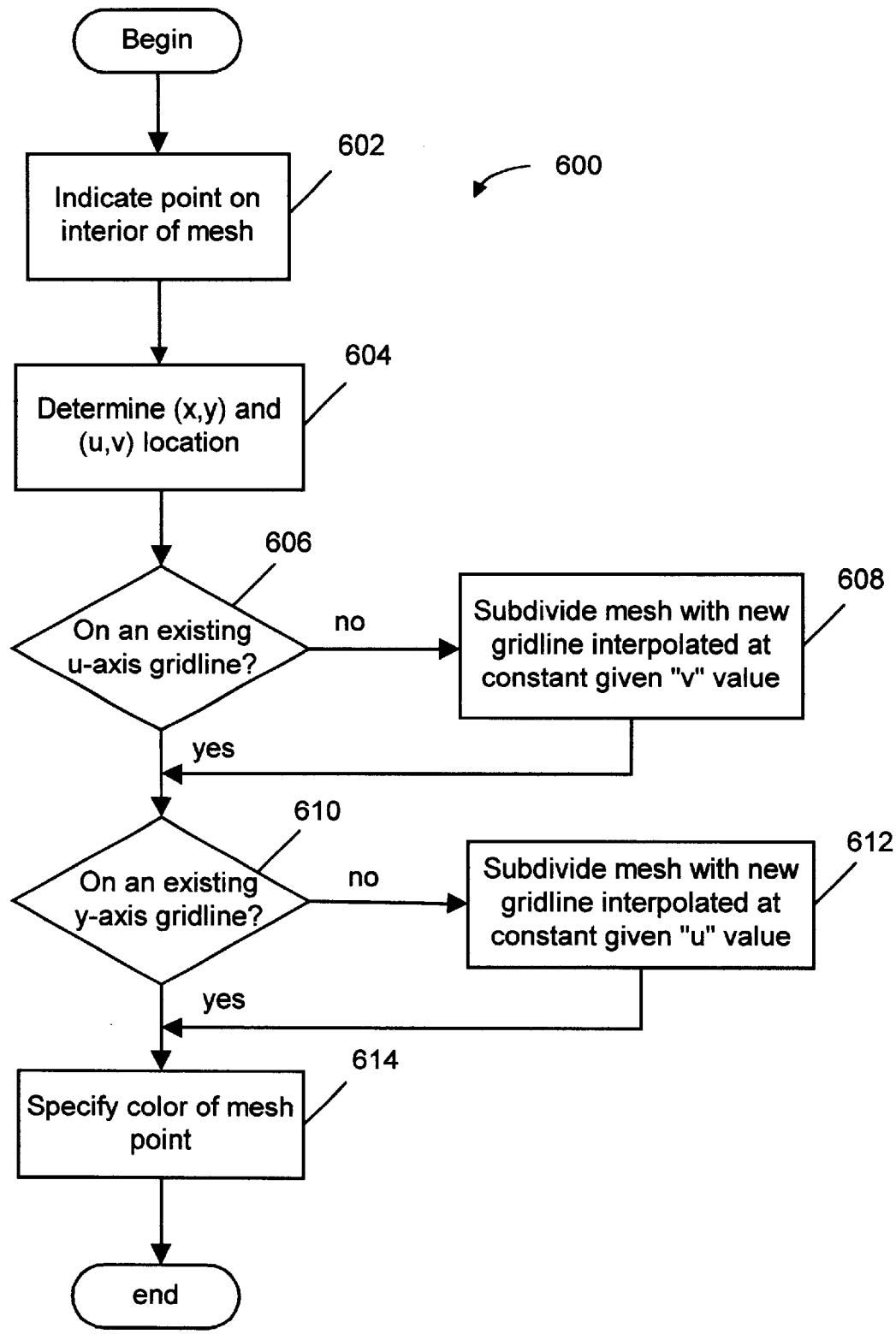
FIG. 7 is a flow diagram of a process for adding a mesh point according to the invention.

A user may add mesh points and grid lines are added by manipulating a user interface to indicate or otherwise select a location within the mesh. A process 600 for adding a mesh point includes selecting a location within the boundaries of the mesh (602), as is shown in FIG. 7. An (x, y) and (u, v) coordinate for the location selected is determined (604). A check is made to determine if the selection is on an existing u-axis gridline for the mesh (606). If not, then the mesh is subdivided and a new gridline is added at a constant v location defined by the (u, v) coordinate for the new mesh point (608).

A check is made to determine if the selection is on an existing v-axis gridline for the mesh (610). If not, then the mesh is subdivided and a new gridline is added at a constant u location defined by the (u, v) coordinate for the new mesh point (612).

The color at the mesh point is specified (614). The color may be specified by the user selecting a color from a color palette or by interpolation of the corner colors of the patch in which the mesh point is located.

The addition of gridlines in steps 608 and 612 may require the creation of more mesh points than just the single mesh point indicated by the user. Additional mesh points may be required in order for a new gridline to correctly interpolate (geometrically) between adjacent gridlines so that the resulting subdivided mesh renders the same as the original mesh. Accordingly, when adding a new horizontal gridline having a constant v value a new mesh point will be defined at each intersection of the new gridline with each existing vertical gridline. In order to achieve smooth shading through each of these new mesh points, the color at these new mesh points may be determined by interpolating between color values of existing mesh points within or on the boundary of the mesh.

Figure 8A:
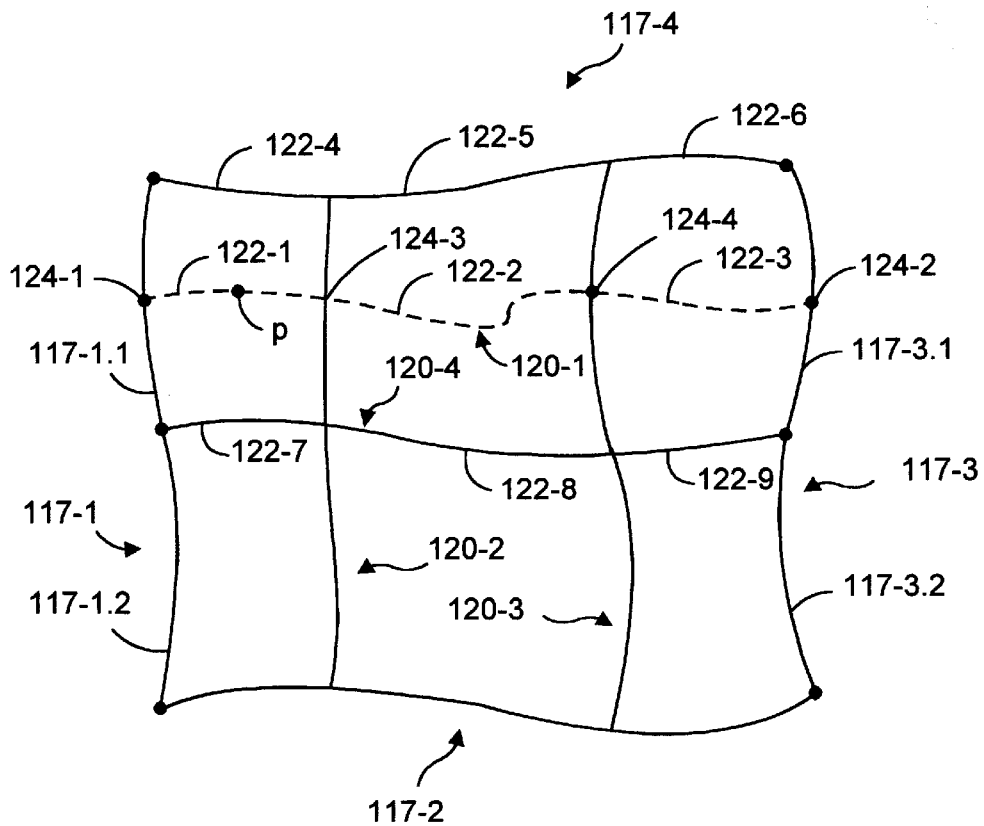
FIGS. 8a and 8b are schematic block diagrams of a mesh reflecting structures resulting from adding a mesh point according to the invention.

More specifically, a new grid line 120-1 is defined at a constant v (or constant u) value on mesh 116 as is shown in FIG. 8*a*. The grid line extends from one boundary 117-1 to an opposite boundary 117-3 passing through the new mesh point p. New mesh points 124-1 and 124-2 are created on the boundary edges 117-1 and 117-3, respectively, at the constant v (or constant u) location. Boundary curves 117-1 and 117-3 are divided at mesh points 124-1 and 124-2, respectively, and stored as new subdivided boundary curves 117-1.1, 117-1.2, 117-3.1 and 117-3.2 respectively. Mesh points 124-3 and 124-44 is defined at the intersection of the new gridline 120-1 and each perpendicular grid line 120-2 and 120-3 provided in the mesh. A color for each mesh point may be derived by interpolation.

Figure 8B:
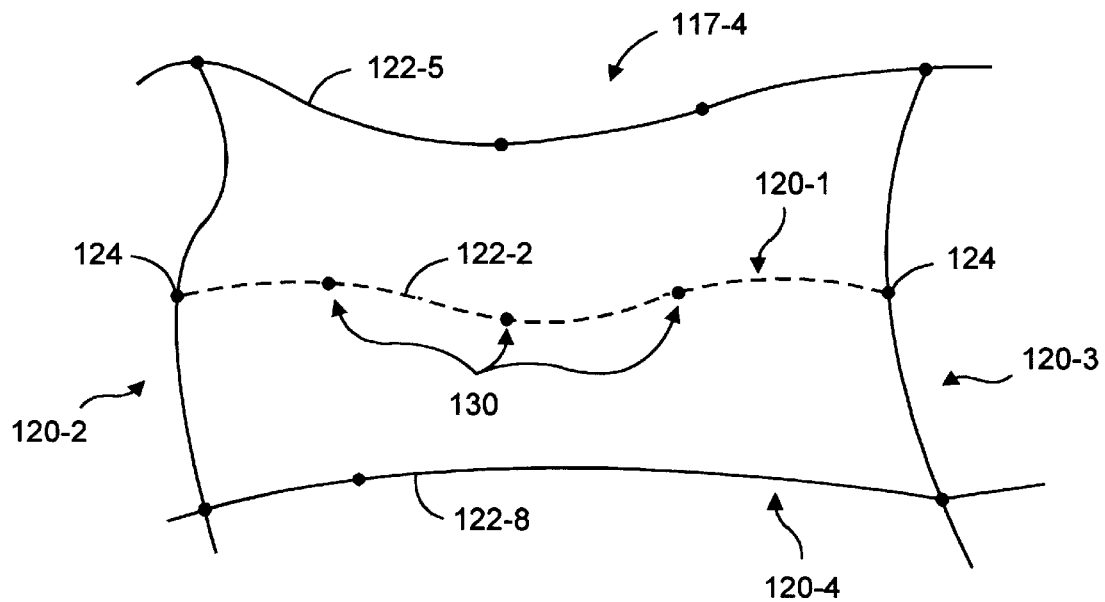

The new gridline comprises a series of edge curves 122-1, 122-2, 122-3 coupled between pairs of the mesh points. Individual edge curves 122-1, -2 and -3 may be generated by interpolation between boundary 117-4 and gridline 120-4 in between which new gridline 120-1 is disposed. Specifically, interpolation between the corresponding individual segments of the boundary line and the old grid line is performed to derive each new edge curve for the new gridline 120-4. The interpolation between curves may result in the generation of soft edge points on new gridline 120-4. Each edge curve of new gridline 120-1 may be required to be constructed of a plurality of cubic Bezier segments in order to assure smooth transitions of color across the region between boundary 117-4 and gridline 120-4. For example, edge 122-5 of boundary 117-4 may include three segments (each a cubic Bezier curve) and edge 122-8 of gridline 120-4 may include two segments as is shown in FIG. 8*b*. The edge curve constructed by interpolating between the adjoining edge curves of boundary line 117-4 and gridline 120-2 will result in the generation of three soft edge points 130 on edge curve 122-2. The process of interpolating between two curves is known in the art. Thereafter, the process ends.

Figure 9:
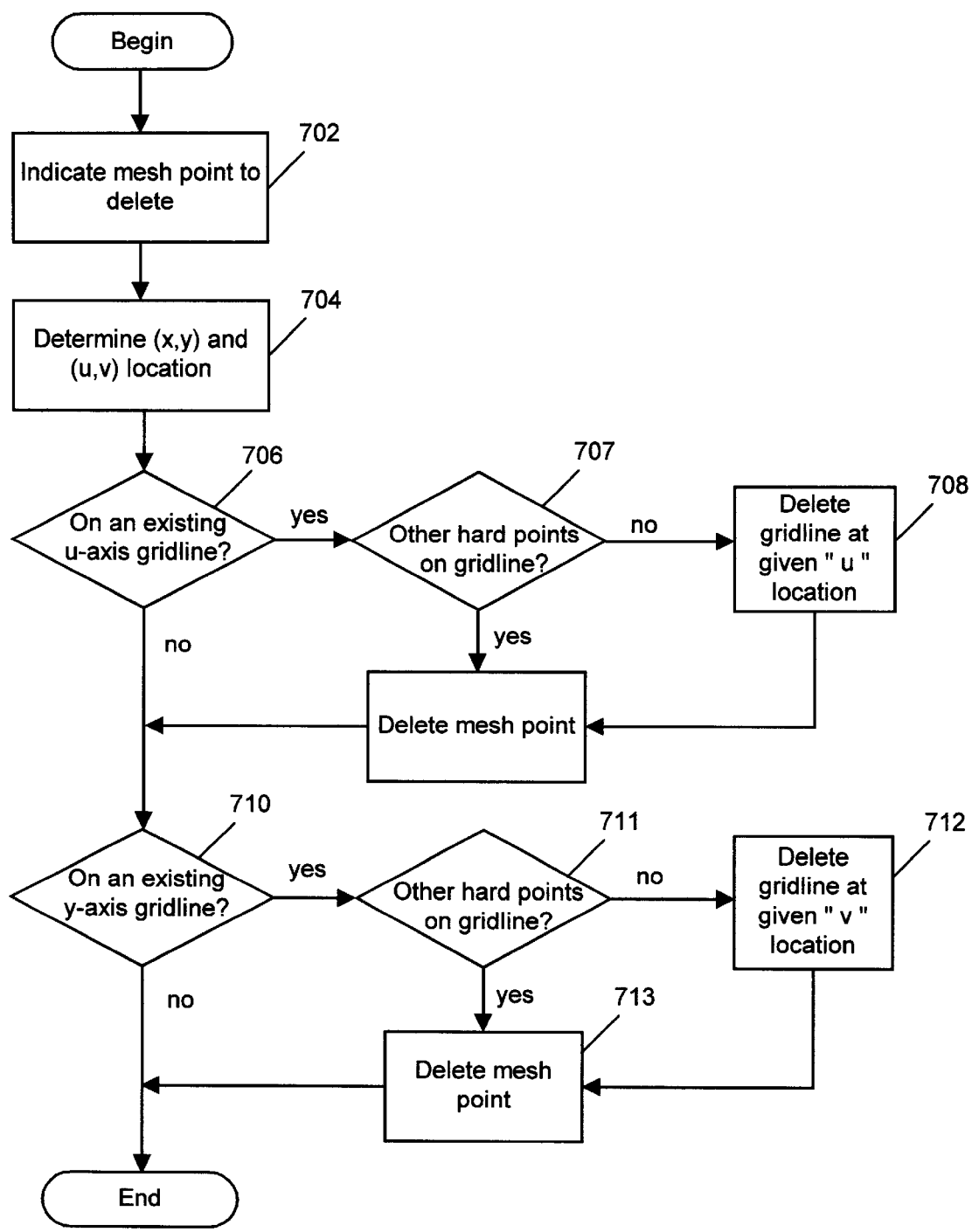
FIG. 9 is a flow diagram of a process for deleting a mesh point according to the invention.

The deletion of a mesh point may result in the deletion of an associated gridline if no other hard points reside on the given gridline. Mesh points and grid lines may be deleted by the user. A process 700 for deleting a mesh point includes selecting a location within the boundaries of the mesh (702) as is shown in FIG. 9. An (x, y) and (u, v) coordinate for the location selected is determined (704). A check is made to determine if the selection is on an existing u-axis gridline for the mesh (706). If so, a check is made to determine if another hard mesh point is designated on the gridline (707). If no hard points are located, then the selected gridline (708) and mesh point (709) may be deleted. If other hard points exist on the gridline, only the mesh point is deleted.

A check is made to determine if the selection is on an existing v-axis gridline for the mesh (710). If so, a check is made to determine if another hard mesh point is designated on the gridline (711). If no hard points are located, then the selected gridline is deleted (712). The mesh point may be deleted as required thereafter (713). If other hard points exist on the gridline, only the mesh point is deleted.

The deletion of gridlines in steps 708 and 712 requires the joining of patch edge curves in the mesh that are intersected by the respective gridline that has been deleted.

Figure 10:
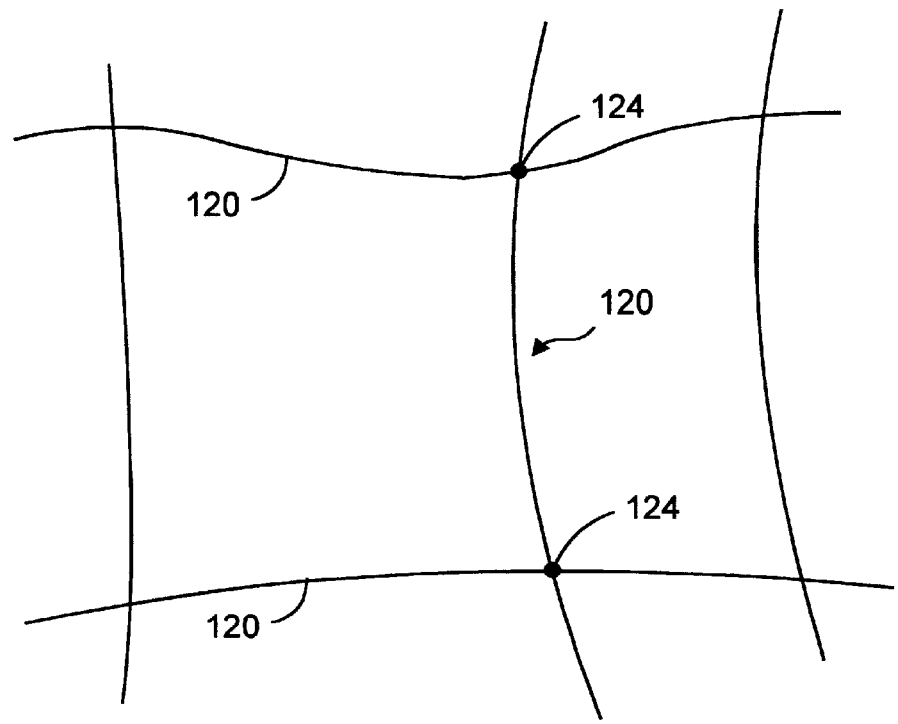
FIG. 10 is a schematic block diagram of a mesh before and after deleting a mesh point according to the invention.
Figure 10:
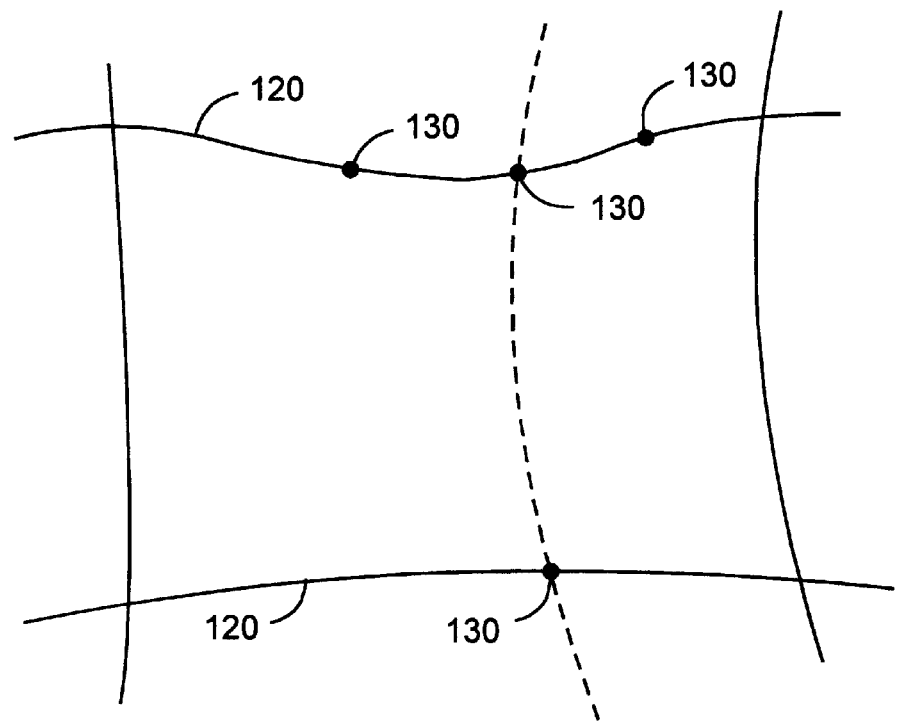

The process for deleting a gridline is similar to the process for deleting a mesh point. When a gridline is deleted, mesh points along the gridline being deleted are transformed to soft edge points (in order to preserve the shape of the remaining gridline curves), as shown in FIG. 10.

The color of any mesh point may be changed by a user selecting the mesh point and providing a color selection. The color selection may be made from a color palette, or a user may invoke a color transformation effect, e.g., change saturation, resulting in the change of the color associated with the selected mesh point. Alternatively, some color transformation effects may be applied to multiple points at one time.

Mesh points or edge points may be moved by a user selecting the point and dragging the point to a new location within the mesh. Unselected points are unaffected by the move operation. Selected points are translated (rigidly). Soft points (which user can not see or select) that lie between two selected hard points are translated rigidly. Soft points that lie between selected and unselected hard points are reshaped. The amount of reshaping is a function of the proximity in parametric space of the soft point to the point that is being rigidly translated.

As described above, the gradient across the object may be changed by manipulating control points or handles associated with the mesh. Each mesh point includes tangent controls that when manipulated result in the reshaping of the gridline curve to pass through the point parallel to the tangent line in normal cubic Bezier fashion.

A mesh may define a complex gradient that includes a foldover. A foldover arises when more than one point in a unit square [(u,v) space] associated with a patch in the mesh maps to a single point in the mesh [(x,y) space]. Foldovers may be localized contained with in a single patch of the mesh, or extend across patch boundaries. Foldovers and methods for rendering patches including foldovers are discussed in greater detail in "Displaying 2D patches with Foldover" cited above. A mesh point or patch may be selected to change the display appearance at foldover edge. For example, the rendering of the patch may result in the display of a front facing view at the foldover edge based on the render order of the patches associated with the mesh. A selection to change the render order may be made to change the display of a foldover edge to a different view, e.g., back facing.

Alternative Implementation

A mesh point may be constrained to move along a gridline that passes through the mesh point. A movement constraint may be particularly useful when moving a perimeter mesh point. By constraining the movement of the mesh point in one axis, changes in only one of the two gridlines that pass through a given mesh point may be made. In this way, movement of a perimeter mesh point may be constrained to affect shading but not the object's shape. A soft edge point may be added to retain the shape of the remaining gridline.

A user may specify colors for edge points. Typically, only mesh points include user-defined colors.

Hierarchical subdivision of a mesh may be enabled. Hierarchical subdivision refers to inserting a mesh point and gridlines within a single patch of a mesh without affecting the geometry of other patches in the mesh. Gridlines may be limited to extend only to the edges of a single patch. Using hierarchical subdivision may permit the development of more complex gradients and allow the effects of subdivision to be limited to a smaller area of the mesh.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device as described herein.

By way of example, FIG. 11 shows a block diagram of a programmable information processing system (computer) 10. Computer 10 preferably includes a processor 20, random access memory (RAM) 21, a program memory 22 (preferably a writable read-only memory (ROM) such as a flash ROM) and an input/output (I/O) controller 24 coupled by a CPU bus 25. Computer 10 may optionally include a hard drive controller 23 which is coupled to a hard disk 30 and CPU bus 25. Hard disk 30 may be used for storing application programs, such as the present invention, and data. Alternatively, application programs may be stored in RAM or ROM.

I/O controller 24 is coupled by means of an I/O bus 26 to an I/O interface 27. I/O interface 27 receives and transmits data in analog or digital form over communication links such as a serial link, local area network, wireless link, and parallel link. Optionally, a display 28, a keyboard 29 and a pointing device (mouse) 31 may also be connected to I/O bus 26. Alternatively, separate connections (separate buses) may be used for I/O interface 27, display 28, keyboard 29 and pointing device 30. Programmable processing system 10 may be preprogrammed or it may be programmed (and reprogrammed) by downloading a program from another source (e.g., a floppy disk, CD-ROM, or another computer).

The invention may be embodied in a computer program that is tangibly stored in a machine-readable storage media or device readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A method for defining a smooth shading across an object for display on a raster output device, the method comprising:

converting the object to a mesh;

dividing the mesh to create a series of patches defining a gradient where patch boundaries correspond to segment vertices in the multisegment edges of a boundary of the object;

rendering the mesh;

displaying the object having a shading defined by the mesh; and editing the mesh until a desired result is achieved in the displayed object.

2. The method of claim 1 wherein the step of converting the object into a mesh includes:

determining a boundary for the object enclosed by a boundary box having four corners;

determining four points on the boundary of the object that are closest to the four corners to the boundary box;

determining four edges on the boundary of the object that connect the four points;

constructing a mesh from the four edges and four points on the boundary of the object resulting in a single patch mesh including four mesh points corresponding to the four corners on the boundary box;

selecting a shading procedure; and determining colors for the four mesh points.

3. The method of claim 2 wherein the step of determining colors includes receiving a user selection for the colors.

4. The method of claim 2 further including receiving a user selection to define the number and arrangement of patches in the mesh where the mesh is an N×M matrix of patches, subdividing the mesh at N−1 regular intervals in a u direction of the mesh and subdividing the mesh at M−1 regular intervals in a v direction of the mesh.

5. The method of claim 4 wherein the shading procedure determines the colors by receiving a color selection for each corner from a palette of available colors where the selection is performed by the user.

6. The method of claim 5 wherein the shading procedure determines the colors by sampling the object at locations corresponding to the mesh points.

7. The method of claim 2 where one or more edges of the boundary for the object comprise multisegment cubic Bezior curves and the step of constructing a mesh includes constructing boundary edges for the mesh where the boundary edges are multisegment cubic Bezier curves having an identical number of segments as their corresponding edge in the boundary of the object.

8. The method of claim 1 wherein the step of editing the mesh includes adding mesh points and defining colors for mesh points resulting in the uniform subdivision of the mesh at the new mesh point.

9. The method of claim 1 wherein the step of editing the mesh includes one of adding a mesh point, deleting a mesh point, adjusting a mesh point tangent, moving a mesh point, and changing the color of a mesh point.

10. A computer program, tangibly stored on a computer-readable medium, for rendering a two dimensional (2D) patch associated with an object to achieve a smooth shading across the object where the 2D patch defines a complex gradient including at least one foldover edge, the computer program comprising instructions for causing a computer to:
    convert the object to a mesh;
    divide the mesh to create a series of patches defining a gradient where patch boundaries correspond to segment vertices in the multisegment edges of a boundary of the object;
    render the mesh;
    display the object having a shading defined by the mesh; and
    edit the mesh until a desired result is achieved in the displayed object.

11. The computer program of claim 10 further including instructions for causing a computer to:
    determine a boundary for the object enclosed by a boundary box having four corners;
    determine four points on the boundary of the object that are closest to the four corners of the boundary box;
    determine four edges on the boundary that connect the four points;
    construct a mesh from the four edges and four points on the boundary of the object resulting in a single patch mesh including four mesh points corresponding to the four corners on the boundary box;
    select a shading procedure; and
    determine colors to the four mesh points.

12. The computer program of claim 11 further including instructions for causing a computer to:
    receive a user selection to create a N×M mesh,
    subdivide the mesh at N−1 regular intervals in a u direction of the mesh; and
    subdivide the mesh at M−1 regular intervals in a v direction of the mesh.

13. The computer program of claim 11 further including instructions for causing a computer to receive a color selection for the four mesh points from a palette of available colors where the selection is performed by the user.

14. The computer program of claim 13 further including instructions for causing a computer to determine the colors for the four mesh points by sampling the object at locations corresponding to the mesh points.

15. The computer program of claim 11 wherein one or more edges of the boundary for the object comprise multisegment cubic Bezier curves and the computer program further includes instructions for causing a computer to construct the mesh boundary edges that are multisegment cubic Bezier curves having an identical number of segments as their corresponding edge in the boundary of the object.

16. The computer program of claim 10 further including instructions for causing a computer to edit the mesh by adding mesh points and defining colors for mesh points resulting in the uniform subdivision of the mesh at the new mesh point.

17. The computer program of claim 10 further including instructions for causing a computer to edit the mesh by performing one of adding a mesh point, deleting a mesh point, adjusting a mesh point tangent, moving a mesh point, and changing the color of a mesh point.

18. A method for defining a smooth shading across an object for display on a raster output device, the object including a boundary comprising edges at least one of which is a multisegment curve, the method comprising:
    converting the object to a mesh including creating a mesh boundary that includes edges that include a same number of segments as a corresponding edge in the boundary of the object;
    rendering the mesh;
    displaying the object having a shading defined by the mesh; and
    editing the mesh until a desired result is achieved in the displayed object.

19. A method for defining a gradient across an object for display on a raster output device, the object including a boundary comprising multisegment edges, the method comprising:
    converting the object to a mesh including creating a mesh boundary that follows a geometry of the boundary of the object and creating a series of patches defining the gradient where patch boundaries correspond to segment vertices in the multisegment edges of the boundary for the object.

20. A method for defining a gradient across an object for display on a raster output device, the object including a boundary comprising multisegment edges, the method comprising:
    selecting the object;
    finding the boundary for the object;
    creating a bounding box including four corners that encloses the object boundary;
    identify four points on the boundary of the object that are closest to the four corners of the boundary box;
    constructing a single patch mesh from the four points and segments connecting pairs of the four points; and
    dividing the single patch mesh to create a series of patches defining the gradient where patch boundaries correspond to segment vertices in the multisegment edges of the boundary of the object.

* * * * *

UNITED STATES PATENT AND TRADEMARK OFFICE
CERTIFICATE OF CORRECTION

PATENT NO.    : 6,271,861 B1
DATED         : August 7, 2001
INVENTOR(S)   : Robert S. Sargent and Paula A. George It is certified that error appears in the above-identified patent and that said Letters Patent is hereby corrected as shown below:

<u>Column 11,</u>
Line 15, please replace "Bezior" with -- Bezier --.

Signed and Sealed this

Twenty-sixth Day of February, 2002

*Attest:*

*Attesting Officer*

JAMES E. ROGAN
*Director of the United States Patent and Trademark Office*